United States Patent [19]

Keller et al.

[11] 4,107,069

[45] Aug. 15, 1978

[54] STORAGE-STABLE PRECURSORS FOR RIGID POLYURETHANE FOAMS

[75] Inventors: Alfred A. Keller, Freehold, N.J.; Robert V. Russo, Brooklyn, N.Y.; Kenneth Treadwell, Rahway, N.J.

[73] Assignee: M&T Chemicals Inc., Stamford, Conn.

[21] Appl. No.: 697,525

[22] Filed: Jun. 18, 1976

Related U.S. Application Data

[63] Continuation-in-part of Ser. No. 592,473, Jul. 2, 1975, abandoned.

[51] Int. Cl.$^2$ .................. C08G 18/06; C08G 18/28
[52] U.S. Cl. ................................ 252/182; 528/367; 521/93
[58] Field of Search .............. 252/182; 260/2.5 AB, 260/2.5 AC, 2.5 AW, 77.5 AB

[56] References Cited

U.S. PATENT DOCUMENTS

| | | | |
|---|---|---|---|
| 3,108,975 | 10/1963 | Lambert et al. | 260/2.5 AB |
| 3,342,757 | 9/1967 | Considine et al. | 260/2.5 AB |
| 3,422,036 | 1/1969 | Ellegast et al. | 20/2.5 AB |
| 3,793,240 | 2/1974 | Smith | 260/2.5 AW |
| 3,892,685 | 7/1975 | Pusey | 260/2.5 AB |
| 3,943,075 | 3/1976 | Fishbein et al. | 260/2.5 AB |

FOREIGN PATENT DOCUMENTS

| | | | |
|---|---|---|---|
| 891,007 | 3/1962 | United Kingdom | 260/2.5 AB |
| 770,526 | 3/1957 | United Kingdom | 260/2.5 AB |

*Primary Examiner*—Benjamin R. Padgett
*Assistant Examiner*—Irwin Gluck
*Attorney, Agent, or Firm*—Robert Spector; Kenneth G. Wheeless

[57] ABSTRACT

Alkali metal salts of carboxylic acids containing from 2 to 20 carbon atoms are unique in comparison to salts of other elements, including stannous octoate, in their ability to retain catalytic activity when stored in the presence of rigid polyurethane foam precursors.

10 Claims, No Drawings

STORAGE-STABLE PRECURSORS FOR RIGID POLYURETHANE FOAMS

BACKGROUND OF THE INVENTION

This application is a continuation-in-part of application Ser. No. 592,473, filed Jul. 2, 1975, now abandoned.

This invention relates to the preparation of rigid cellular polyurethanes. This invention further relates to catalyst-containing precursors for these polyurethanes which can be stored for considerable periods of time without any significant decrease in their reactivity with polyfunctional isocyanates.

Rigid polyurethane foams are widely used as insulating materials in the construction industry. The light weight and low heat conductivity of these foams make them desirable for use as insulation in containers for keeping materials hot or cold.

Rigid polyurethane foams can be prepared using a variety of well-known methods. In some instances it is desirable to prepare the foam at the location where it will be employed, such as between the inner and outer walls of a building or container. For these applications it is most preferred to use a pre-packaged two-component system, one of which is a polyfunctional isocyanate such as polymethylene polyphenyl isocyanate. The second component contains the polyol, gel catalyst and blowing agent together with any other modifiers and additives. A surfactant such as a siloxane polymer is usually included to ensure a uniform cell structure in the final foam. The second component may be stored for weeks or even months before it is reacted with the isocyanate.

It is well known that both divalent and tetravalent tin compounds are effective gel or polymerization catalysts for cellular polyurethanes. Two of the most preferred catalysts are stannous 2-ethylhexoate and dibutyltin dilaurate. Unfortunately these catalysts, in addition to most of the other classes of tin compounds, undergo a substantial loss of activity when incorporated into a precursor or "masterbatch" that is stored for any considerable length of time before being reacted with the isocyanate component. The masterbatch contains all of the reactants, catalysts and modifiers with the exception of the polyfunctional isocyanate. These tin compounds would therefore not be suitable for use in a pre-packaged two-component system for preparing rigid cellular polyurethanes.

It is therefore an objective of this invention to define a class of catalysts which do not lose activity in the presence of conventional precursors for rigid polyurethane foams. A second objective is to prepare storage-stable precursors for rigid cellular polyurethanes.

SUMMARY OF THE INVENTION

This invention provides a storage-stable precursor for rigid cellular polyurethanes. The precursor comprises a polyol containing at least 2 active hydrogen atoms, as determined by the Zerewitinoff method, a blowing agent, a gel catalyst and a silicone-containing surfactant. The gel catalyst is an alkali metal salt of a carboxylic acid containing from 2 to 20 carbon atoms. These compounds are unique in that they retain their catalytic activity when stored for extended periods of time in contact with the aforementioned precursors.

DETAILED DESCRIPTION OF THE INVENTION

The present gel catalysts are useful for preparing rigid polyurethane foams from substantially all of the known polyols and polyfunctional isocyanates conventionally employed for this purpose. The catalysts are alkali metal salts of carboxylic acids containing between 2 and 20 carbon atoms and are employed at a concentration of between 0.1 and 10%, based on the weight of polyol. These salts, which can also be referred to as reaction products of a carboxylic acid with an alkali metal hydroxide, include reaction products of lithium, sodium or potassium hydroxide with the desired acid. Suitable monocarboxylic acids include acetic, propanoic, butanoic, pentanaic, hexanoic, heptanoic and 2-ethylhexanoic acids in addition to other acids containing up to 20 carbon atoms. Unsaturated carboxylic acids derived from oils, such as tall oils, or animal fats, including oleic acid and linoleic acid, may also be employed. Aromatic carboxylic acids such as benzoic acid and its salt-forming derivatives that exhibit various substituents on the phenyl ring, salicylic acid, and the isomeric naphthenoic acids are also suitable. Polycarboxylic acids, such as oxalic, malonic, succinic, glutaric, adipic, pimelic, suberic, azelaic, sebacic, brassylic, thapsic, maleic, fumaric, glutaconic, $\alpha$-hydroxymuconic, $\beta$-hydroxymuconic, $\alpha$-butyl-$\alpha$-ethylglutaric, $\alpha,\beta$-diethylsuccinic, isophthalic, terephthalic, hemimellitic and 1,4-cyclohexane dicarboxylic acids, can be used in place of a monocarboxylic acid. All of the foregoing acids can be employed separately or in mixtures containing two or more acids.

The alkali metal salt or soap is conveniently prepared by complete neutralization of the carboxylic acid with an aqueous solution of the desired alkali metal hydroxide. Other basic salts, such as carbonates, may be used in place of the hydroxide. Agitation and careful control of the exothermic reaction are required to avoid localized overheating and resultant product discoloration. The water present in the reaction mixture is then removed, preferably under reduced pressure.

Optionally a water-miscible organic diluent is employed as a viscosity suppressant and/or a solvent for the reactants, the salt or both. In accordance with this procedure, the carboxylic acid is first dissolved in the diluent, followed by neutralization of the acid using an aqueous or alcoholic solution of the desired alkali metal hydroxide or other suitable basic salt. The liquid phase is then removed to isolate the salt. Suitable organic diluents include alcohols such as methanol, ethanol, propanol, butanol and the like; glycols such as ethylene glycol, diethylene glycol and poly(ethylene glycols), propylene glycol, dipropylene glycol and poly(propylene glycols) and the like.

The present gel catalysts are suitable for use with substantially all of the known polyalkylene polyols and polyfunctional isocyanates conventionally employed to prepare rigid polyurethane foams. Suitable polyols are liquids which typically exhibit an average molecular weight of between about 500 and 6000 and include hydroxyl-containing polyethers, polyesters and polyamides and alkylene glycols. These polyols exhibit either primary or secondary active hydroxyl groups. The class of hydroxyl-containing polyethers or polyesters includes fatty acid glycerides having hydroxyl numbers between 50 and 75, such as castor oil, hydrogenated castor oil and "blown" natural oils.

Hydroxyl-terminated polyethers, a preferred type of polyol, include polyalkylene glycols, e.g. polyethylene glycols and polypropylene glycols. The molecular weight of these compounds is preferably between about 200 and 6000.

A type of polyether that is particularly preferred for rigid polyurethane foams is obtained by polymerizing propylene oxide in the presence of sucrose or other compound containing at least three hydroxyl groups. The resultant product exhibits the polyfunctionality required to achieve the crosslinking characteristic of rigid polyurethane foams.

Hydroxyl-terminated polyesters, a second type of polyol, can be obtained by the esterification-condensation reaction of aliphatic dibasic carboxylic acids with glycols, triols or mixtures thereof, in proportions such that most of all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a di- or polyhydroxylated compound such as ethylene glycol, trimethylol propane and pentaerythrotol.

The polyfunctional isocyanates used to prepare rigid polyurethane foams include both polyisocyanates and polyisothiocyanates. While the invention is described with specific references to the reaction of certain polyfunctional isocyanates, it is generically applicable to the reaction of any compound containing more than two —N=C=G radicals wherein G is oxygen or sulfur. Compounds within this generic definition include polyisocyanates and polyisothiocyanates of the formula $R(NCG)_x$ in which the average value of $x$ is greater than 2, preferably from 2.1 to 3.0. R can be alkylene, substituted alkylene, arylene, substituted arylene or other divalent hydrocarbon group that may optionally contain one or more aryl-NCG bonds and one or more alkyl-NCG bonds. Suitable isocyanates include the polyfunctional by-products obtained during the preparation of methylene para-phenyl diisocyanate. Polymethylene polyphenyl isocyanate is an example of such a by-product. Triisocyanates obtained by reacting 3 moles of an arylene diisocyanate for each mole of a triol, e.g. the products formed from 3 moles of tolylene diisocyanate and 1 mole of hexane triol are also useful.

In addition to polyol and one or more of the present catalysts, the precursor contains a blowing agent which boils or decomposes at the elevated temperatures produced during the polyol-isocyanate reaction to yield a gaseous product which forms bubbles that are entrapped within the reacting polyol-isocyanate mixture. Among the preferred blowing agents are those halogen-containing hydrocarbons boiling from 30° to about 90° C. The precursor also usually contains a surfactant, preferably a siloxane-alkylene oxide copolymer, in an amount of from 1 to about 5 parts by weight per 100 parts of polyol. A conventional cocatalyst, such as a tertiary amine, is usually included in the formulation at a concentration of from 0.1 to 5 parts by weight per 100 parts of polyol.

As previously disclosed, the present alkali metal salts are unique in that their catalytic activity is not adversely affected to any significant extent in the presence of a precursor or masterbatch containing all of the ingredients, other than the isocyanate, required to prepare a rigid polyurethane foam. The type of formulation is desirable for the "on-site" application of rigid foams at remote locations. This is often at a construction site where there are no facilities for measuring and uniformly blending the various components of the precursor. Metered amounts of the precursor and polyfunctional isocyanate are blended just prior to formation of the foam. Depending upon the particular end use, the resultant mixture is sprayed onto a surface or poured into a cavity and allowed to react, forming a rigid foam. The time required to form the foam is preferably between 5 and 50 seconds.

The accompanying examples demonstrate the long-term retention of reactivity that characterizes precursors containing the present catalysts and compares these results with those obtained using other conventional tin-containing catalysts. The interval between combining of all reagents and the onset of foaming, usually indicated by a transformation of the reaction mixture from clear to opaque, is referred to as "cream time". The time interval between combining of the precursor with the polyfunctional isocyanate and the completion of the ensuing foaming reaction is referred to as the "rise time". All parts and percentages are by weight unless otherwise specified.

EXAMPLE 1

A precursor or masterbatch for a rigid polyurethane foam was prepared by combining the following components in the indicated proportions. The polyol is a polyhydroxy-based propylene oxide-ethylene oxide copolymer exhibiting a hydroxyl number of 490 and available as LS-490 from the Union Carbide Chemical Corporation. The surfactant is a siloxane-oxyethylene-oxypropylene copolymer available as L-550 from the Union Carbide Chemical Corporation.

| PRECURSOR | |
|---|---|
| COMPONENT | PARTS BY WEIGHT |
| Polyol | 100 |
| Surfactant | 1.5 |
| Trichlorofluoromethane | 30 |
| Dimethylcyclohexyl amine | 1.0 |
| Catalyst | 1.0 |

A 133.5 parts of the precursor was combined with 122 parts of polymethylene polyphenyl isocyanate (isocyanate equivalent of about 133). The resultant mixture was then stirred rapidly for several seconds, poured into a suitable container and allowed to rise. The cream and rise times were noted. The remaining portion of each precursor was placed in a closed container and stored for six months under ambient conditions of temperature and pressure. At the end of this period the precursor was reacted with the polyfunctional isocyanate as described hereinabove. The cream and rise times were noted and are recorded in the accompanying table together with the values observed for the freshly prepared precursor.

The data in the table demonstrate the uniqueness of the present gel catalysts with regard to retention of reactivity in precursors for rigid polyurethane foams. The control precursor exhibited a substantial reduction in activity during storage.

Each of the catalysts evaluated is represented by a number as follows:

| | 1 - Potassium 2-ethylhexoate<br>2 - Dibutyltin dilaurate (a conventional<br>gel catalyst employed as a control) | | | | |
|---|---|---|---|---|---|
| | Initial Reactivity | | Reactivity Following<br>6-Month Storage | | % Loss<br>in<br>Rise Time |
| Catalyst<br>No. | Cream Time<br>(sec.) | Rise Time<br>(sec.) | Cream Time<br>(sec.) | Rise Time<br>(sec.) | During<br>Storage |
| 1 | 27 | 41 | 25 | 41 | 0 |
| 2 (Control) | 22 | 34 | 31 | 47 | 38 |

What is claimed is:

1. A stable precursor for preparing rigid cellular polyurethanes, said precursor consisting essentially of
   (a) a polyol containing at least 2 active hydrogen atoms, as determined by the Zerewitinoff method,
   (b) a silicone-containing surfactant in an amount from about 1 to 5 parts by weight per 100 parts of said polyol,
   (c) halogen-containing hydrocarbon, boiling from 30° to 90° C, blowing agents in an amount from about 10 to 50 parts by weight per 100 parts of said polyol, and
   (d) a catalytically effective amount of a gel catalyst composition consisting of a tertiary amine and an alkali metal salt of a carboxylic acid containing from 2 to 20 carbon atoms.

2. A stable precursor according to claim 1 wherein the alkali metal is potassium or sodium.

3. A stable precursor as set forth in claim 2 wherein the alkali metal is potassium.

4. A stable precursor according to claim 1 wherein the carboxylic acid contains from 8 to 12 carbon atoms.

5. A stable precursor according to claim 4 wherein the carboxylic acid is 2-ethylhexoic acid.

6. A stable precursor according to claim 1 wherein said blowing agent is a halogen-containing hydrocarbon and boils from 30° to about 90° C. under ambient pressure.

7. A stable precursor according to claim 1 wherein said polyol is a polymer of propylene oxide.

8. A stable precursor according to claim 1 wherein said polymer contains repeating units derived from the polymerization of ethylene oxide.

9. A stable precursor according to claim 1 wherein said alkali metal salt is present at a concentration of from 0.1 to 10.0 parts by weight per 100 parts of polyol.

10. A stable precursor according to claim 1 wherein said tertiary amine exhibits the formula R'R"R'" wherein R', R" and R'" are individually selected from the group consisting of alkyl containing from 1 to 12 carbon atoms and cycloalkyl.

* * * * *